US012716395B2

(12) United States Patent
Bauvir et al.

(10) Patent No.: US 12,716,395 B2
(45) Date of Patent: Aug. 25, 2026

(54) ENGINE SYSTEM

(71) Applicant: Volvo Truck Corporation, Gothenburg (SE)

(72) Inventors: Laurent Bauvir, Lyons (FR); Herve Queret, Saint-Just Chaleyssin (FR); Lionel Simon, Lyons (FR); Jean-Christophe Palmer, Solaize (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/994,268

(22) PCT Filed: Jul. 19, 2022

(86) PCT No.: PCT/EP2022/070255
§ 371 (c)(1),
(2) Date: Jan. 14, 2025

(87) PCT Pub. No.: WO2024/017464
PCT Pub. Date: Jan. 25, 2024

(65) Prior Publication Data
US 2026/0028951 A1 Jan. 29, 2026

(51) Int. Cl.
*F02M 26/05* (2016.01)
*F02B 37/22* (2006.01)
(Continued)

(52) U.S. Cl.
CPC ............. *F02M 26/05* (2016.02); *F02B 37/22* (2013.01); *F02M 26/16* (2016.02); *F02M 26/52* (2016.02)

(58) Field of Classification Search
CPC ........ F02M 26/05; F02M 26/16; F02M 26/51; F02M 26/52; F02M 26/67; F02B 37/02;
(Continued)

(56) References Cited

U.S. PATENT DOCUMENTS 8,196,403 B2 6/2012 Hittle et al.
2007/0137200 A1 6/2007 Rammer et al.
2019/0249606 A1* 8/2019 Mohlin ..................... F02D 9/02

FOREIGN PATENT DOCUMENTS

CN 110145419 A * 8/2019 ............. F02M 26/04
EP 1598539 A1 11/2005
EP 3523527 A1 8/2019

OTHER PUBLICATIONS

International Search Report of the International Searching Authority, PCT/EP2022/070255 mailed Mar. 20, 2023, 3 pages.

* cited by examiner

*Primary Examiner* — Loren C Edwards
(74) *Attorney, Agent, or Firm* — Sage Patent Group

(57) ABSTRACT

An engine system comprises an internal combustion engine with two sets of cylinders, a turbocharger, two exhaust conduits providing fluid communication between the turbocharger and the exhaust of the sets of cylinders, and an exhaust gas recirculation system comprising a recirculation valve. Two proportional exhaust valves are adapted to control a flow of exhaust gas in the two exhaust conduits. In a first configuration, the two exhaust valves are open and the recirculation valve is closed. In a second configuration, a first of the two exhaust valve is in its closed position. The engine system comprises an actuator and a kinematic chain to operate at least two valves among the three valves. A first movement of the actuator operates each of the two valves and a second movement of the actuator operates only one of the two valves.

11 Claims, 4 Drawing Sheets

(51) Int. Cl.
*F02M 26/16* (2016.01)
*F02M 26/52* (2016.01)

(58) Field of Classification Search
CPC ... F02B 37/22; F02D 9/06; F02D 9/08; F02D 9/10; F16K 11/18; F16K 11/22
See application file for complete search history.

ENGINE SYSTEM

CROSS REFERENCE TO RELATED APPLICATIONS

This application is a 35 U.S.C. § 371 national stage application of PCT International Application No. PCT/EP2022/070255 filed on Jul. 19, 2022, the disclosure and content of which is incorporated by reference herein in its entirety.

TECHNICAL FIELD

The disclosure relates generally to vehicles powered by internal combustion engine. In particular aspects, the disclosure relates to an engine system.

The disclosure can be applied in heavy-duty vehicles, such as trucks, buses, and construction equipment. Although the disclosure will be described with respect to a particular vehicle, the disclosure is not restricted to any particular vehicle.

BACKGROUND

In the domain of heavy-duty vehicles, such as trucks, powered by an internal combustion engine, it is known to provide an engine system comprising an internal combustion engine with two set of cylinders, each set of cylinders having a separate exhaust collector in fluid communication with a turbocharger. Such an engine system usually comprises two proportional exhaust valves, each proportional exhaust valve being operable to control the flow of exhaust gas from the exhaust collector of one of the set of cylinders to the turbocharger.

When the vehicle is operated in normal condition, the flow of exhaust gas generated by each set of cylinders is directed from the exhaust collector of the corresponding set of cylinders to the turbocharger.

It is also known to use an exhaust gas recirculation technique to decrease the nitrogen oxide emission of the engine. This technique consists in redirecting the flow of exhaust gas from a first exhaust collector to an intake of the internal combustion engine, while allowing the flow of exhaust gas from the second exhaust collector to the turbocharger. The engine system thus comprises a recirculation conduit providing fluid communication between the first exhaust collector and the intake of the internal combustion engine and a proportional recirculation valve to control the flow of exhaust gas through the recirculation conduit, which is open when the exhaust gas recirculation technique is used and closed otherwise.

It is also known to close the two proportional exhaust valves so as to prevent the flow of exhaust gas from the two exhaust collectors to the turbocharger under certain operating conditions, for example to brake the engine.

Therefore, such usual engine system comprises three actuators, each actuator operating one valve among the two proportional exhaust valves and the proportional recirculation valve. Due to the presence of several actuators, these engine systems are expensive to manufacture, cumbersome and prone to failure.

It is to these disadvantages that the invention intends more particularly to remedy by proposing an engine system that is less expensive to manufacture, more compact and more reliable.

SUMMARY

The invention aims to improve the compactness of the engine system by reducing the number of actuators needed to operate the engine system valves.

According to an aspect of the disclosure, the invention concerns an engine system comprising:

- an internal combustion engine, comprising an intake, a first set of cylinders including at least a first cylinder and a first exhaust collector, and a second set of cylinders including at least a second cylinder and a second exhaust collector,
- a turbocharger,
- a first exhaust conduit, providing fluid communication between the first exhaust collector and the turbocharger,
- a second exhaust conduit, providing fluid communication between the second exhaust collector and the turbocharger,
- an exhaust gas recirculation system, comprising:
  - a recirculation conduit, providing fluid communication between the first exhaust collector and the intake of the internal combustion engine, and
  - a proportional recirculation valve, adapted to control a flow of exhaust gas in the recirculation conduit, and operable between an open position in which the flow of exhaust gas is allowed, and a closed position in which the flow of exhaust gas is prevented, the closed position being a resting position of the proportional recirculation valve,
- a first proportional exhaust valve, adapted to control a flow of exhaust gas in the first exhaust conduit, and operable between an open position in which the flow of exhaust gas is allowed, and a closed position in which the flow of exhaust gas is prevented, the open position being a resting position of the first proportional exhaust valve, and
- a second proportional exhaust valve, adapted to control a flow of exhaust gas in the second exhaust conduit, and operable between an open position in which the flow of exhaust gas is allowed, and a closed position in which the flow of exhaust gas is prevented, the open position being a resting position of the second proportional exhaust valve.

The engine system is switchable between a first configuration, in which the first proportional exhaust valve and the second proportional exhaust valve are in their open position and in which the proportional recirculation valve is in its closed position, and a second configuration, in which the first proportional exhaust valve is in its closed position. The engine system comprises an actuator and a kinematic chain configured to operate at least two valves among the proportional recirculation valve, the first proportional exhaust valve and the second proportional exhaust valve. An output component of the actuator is in a neutral position when the engine system is in the first configuration. A first movement of the output component, from its neutral position and in a first direction, operates each of the two valves from its resting position to another position, and a second movement of the output component, from its neutral position and in a second direction opposite to the first direction, operates only one of the two valves from its resting position to another position.

Hereby, a technical effect of the invention includes needing only one actuator to operate two valves among the three valves of the engine system, and to operate both valves or only one valve, depending on the direction of movement of the output component of the actuator. Owing to the invention, the engine system is less expensive to manufacture, more compact and more reliable than existing engine systems.

In certain examples, the output component of the actuator is configured to operate the first proportional exhaust valve and the second proportional exhaust valve. The first movement of the output component closes the first proportional exhaust valve and the second proportional exhaust valve, and the second movement of the output component closes the first proportional exhaust valve and does not operate the second proportional exhaust valve. Hereby, the two proportional exhaust valves are controlled with the same actuator which results in optimized control of the proportional exhaust valves while maintaining an independent control, thus more precise, of the proportional recirculation valve.

In certain examples, the first movement of the output component closes the first proportional exhaust valve and the second proportional exhaust valve at the same speed. Hereby, the flow of exhaust gas in the first exhaust conduit is identical to the flow of exhaust gas in the second exhaust conduit, which improves the performances of the engine system.

In certain examples, each one of the first proportional exhaust valve and the second proportional exhaust valve is an asymmetric flap valve comprising a flap and a shaft. The rotation of the shafts lead to the opening or closing of the flaps and the rotation of the shafts is driven by the output component of the actuator. Thanks to the use of asymmetric flap valves, the proportional exhaust valves return naturally to the open position when the actuator is not operating the proportional exhaust valves, thus improving the operation of the engine system.

In certain examples, the kinematic chain comprises a first transmission device connected to the output component of the actuator and to the first proportional exhaust valve, a second transmission device connected to the first transmission device and to the second proportional exhaust valve and a first asymmetrical linkage, the first asymmetrical linkage being configured to transmit the first movement of the output component from the first transmission device to the second transmission device, and not to transmit the second movement of the output component from the first transmission device to the second transmission device. Hereby, thanks to the asymmetrical linkage, it is possible to choose whether or not the actuator operates the second proportional exhaust valve only by selecting the direction of movement of the output component of the actuator.

In certain examples, the first asymmetrical linkage comprises a tab, mounted on the first transmission device and an abutment surface located on the second transmission device. During the first movement of the output component, the tab is in abutment against the abutment surface, and during the second movement of the output component, the tab is not in contact with the abutment surface. Hence, the asymmetrical linkage is particularly simple to implement, therefore cost-effective and reliable.

In certain examples, the output component of the actuator is configured to operate the first proportional exhaust valve and the proportional recirculation valve. The first movement of the output component closes the first proportional exhaust valve and opens the proportional recirculation valve and the second movement of the output component closes the first proportional exhaust valve and does not operate the proportional recirculation valve. Hence, the two valves to be operated when exhaust gas recirculation is needed are operated by the same actuator. This facilitates and makes reliable the implementation of exhaust gas recirculation techniques.

In certain examples, the kinematic chain comprises a first transmission device connected to the output component of the actuator and to the first proportional exhaust valve, a third transmission device connected to the first transmission device and to the proportional recirculation valve and a second asymmetrical linkage, the second asymmetrical linkage being configured to transmit the first movement of the output component from the first transmission device to the third transmission device, and not to transmit the second movement of the output component from the first transmission device to the third transmission device. Hereby, thanks to the asymmetrical linkage, it is possible to choose whether or not the actuator operates the proportional recirculation valve only by selecting the direction of movement of the output component of the actuator.

In certain examples, the proportional recirculation valve is a poppet valve and the second asymmetrical linkage includes a cam mounted onto the first transmission device and a roller attached to the third transmission device. Thanks to the use of a poppet valve and the use of a cam system, controlling the proportional recirculation valve when gas recirculation is needed is particularly simple, effective and reliable.

In certain examples, the output component of the actuator is configured to operate the first proportional exhaust valve, the second proportional exhaust valve and the proportional recirculation valve. The first movement of the output component closes the first proportional exhaust valve and the second proportional exhaust valve and does not operate the proportional recirculation valve and the second movement of the output component closes the first proportional exhaust valve, opens the proportional recirculation valve and does not operate the second proportional exhaust valve. Hence, since the three valves are operated by the same actuator, the engine system is even less expensive to manufacture and more compact than existing engine systems.

In certain examples, the kinematic chain comprises a first transmission device connected to the output component of the actuator and to the first proportional exhaust valve, a second transmission device connected to the first transmission device and to the second proportional exhaust valve, a third transmission device connected to the first transmission device and to the proportional recirculation valve, a first asymmetrical linkage, the first asymmetrical linkage being configured to transmit the first movement of the output component from the first transmission device to the second transmission device, and not to transmit the second movement of the output component from the first transmission device to the second transmission device, and a second asymmetrical linkage, the second asymmetrical linkage being configured to transmit the second movement of the output component from the first transmission device to the third transmission device, and not to transmit the first movement of the output component from the first transmission device to the third transmission device. Hereby, thanks to the two asymmetrical linkages, it is possible to choose whether or not the actuator operates the second proportional exhaust valve and the proportional recirculation valve only by selecting the direction of movement of the output component of the actuator.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical effects and corresponding advantages.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
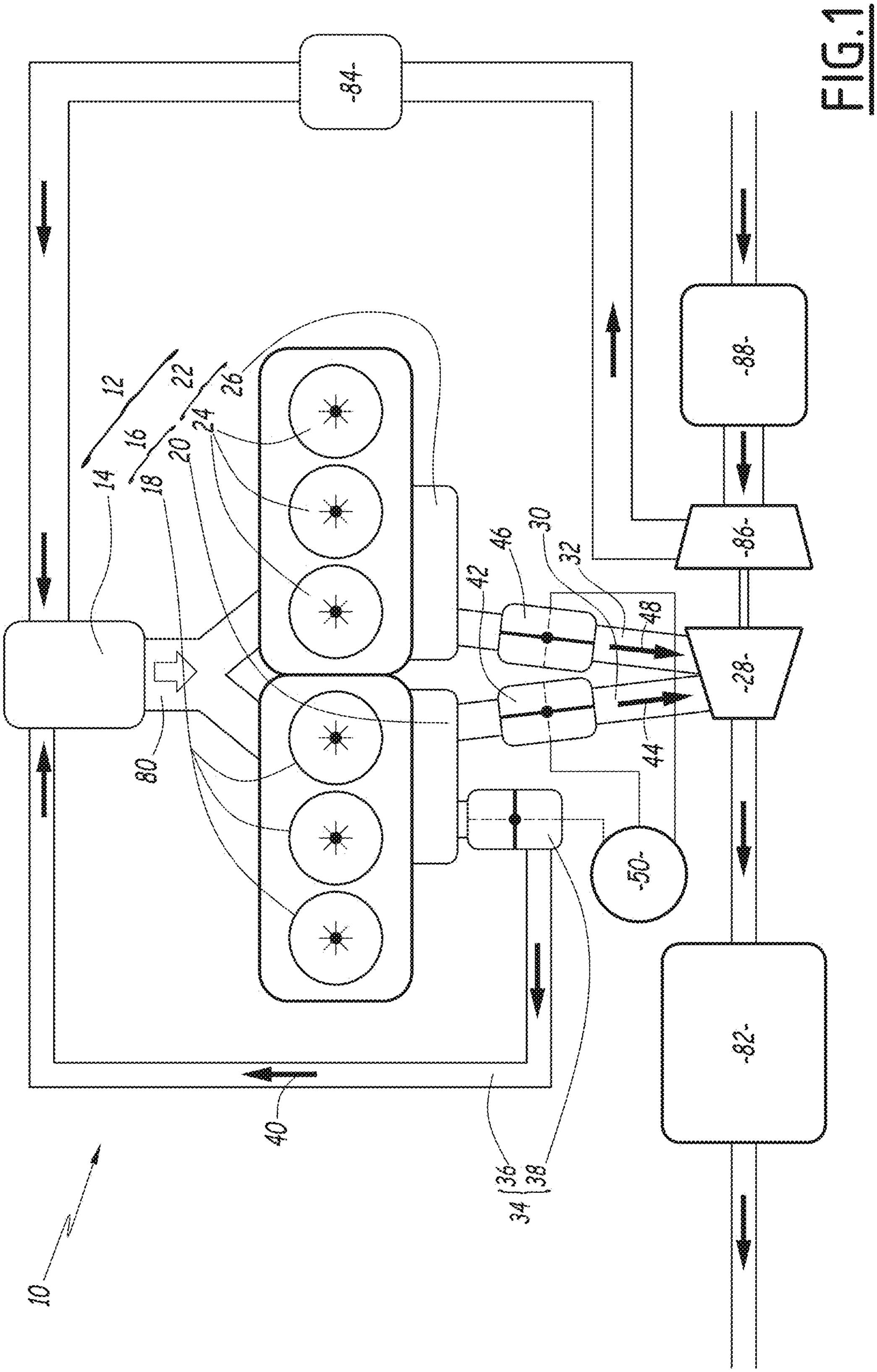
FIG. 1 is a schematic view of an exemplary engine system according to the invention.

An exemplary engine system 10 is visible in FIG. 1. The engine system 10 is intended to be installed in a vehicle to propel the vehicle. Such a vehicle can be, for example, a heavy-duty vehicle, such as a truck, a bus or a construction equipment.

The engine system 10 comprises an internal combustion engine 12, propelled by the combustion of a fuel, such as, for example, diesel. The internal combustion engine 12 comprises an intake 14, a first set of cylinders 16 including at least a first cylinder 18 and a first exhaust collector 20, and a second set of cylinders 22 including at least a second cylinder 24 and a second exhaust collector 26. In the example, the first and second sets of cylinders each comprise three cylinders 18, 24. As a variant, not shown, each set of cylinders comprises a different number of cylinders, for example four cylinders.

The engine system 10 comprise an intake conduit 80, providing fluid communication between the intake 14 and the first and second sets of cylinders 16, 22. The intake 14 provides an oxidizing agent, such as air, to the first and second sets of cylinders, for the fuel combustion.

The engine system 10 comprises a fuel injection system, not shown, providing fuel to the first and second sets of cylinders 16, 22.

The engine system 10 comprises a turbocharger 28, a first exhaust conduit 30, providing fluid communication between the first exhaust collector 20 and the turbocharger, and a second exhaust conduit 32, providing fluid communication between the second exhaust collector 26 and the turbocharger.

Advantageously, the engine system 10 comprises an exhaust after-treatment system 82, in fluid communication on its intake with the output of the turbocharger 28 and on its output with an exhaust system, not shown. The exhaust after-treatment system 82 is configured to clean the exhaust gases produced by the internal combustion engine 12, by filtering certain pollutants and transforming other pollutants into non-polluting gases by means of chemical reactions.

Advantageously, the engine system 10 comprises a charged air cooler 84. The output of the charged air cooler 84 is in fluid communication with the intake 14 of the internal combustion engine 12. The charged air cooler 84 provides cooled air to the internal combustion engine 12.

Advantageously, the engine system 10 comprises a compressor 86, providing compressed air to the charged air cooler 84. In the example, the compressor 86 is driven by the turbocharger 28.

Advantageously, the engine system 10 comprises an air filter 88, in fluid communication with the intake of the compressor 86, thus filtering the air provided to the compressor 86 and to the charged air cooler 84.

The engine system 10 comprises an exhaust gas recirculation system 34, allowing recirculating the exhaust gases of the first set of cylinders 16 to the intake 14 of the internal combustion engine 12. The exhaust gas recirculation system 34 comprises a recirculation conduit 36 and a proportional recirculation valve 38, that is, a continuously operable valve.

The recirculation conduit 36 provides fluid communication between the first exhaust collector 20 of the first set of cylinders 16 and the intake 14 of the internal combustion engine 12.

Figure 2:
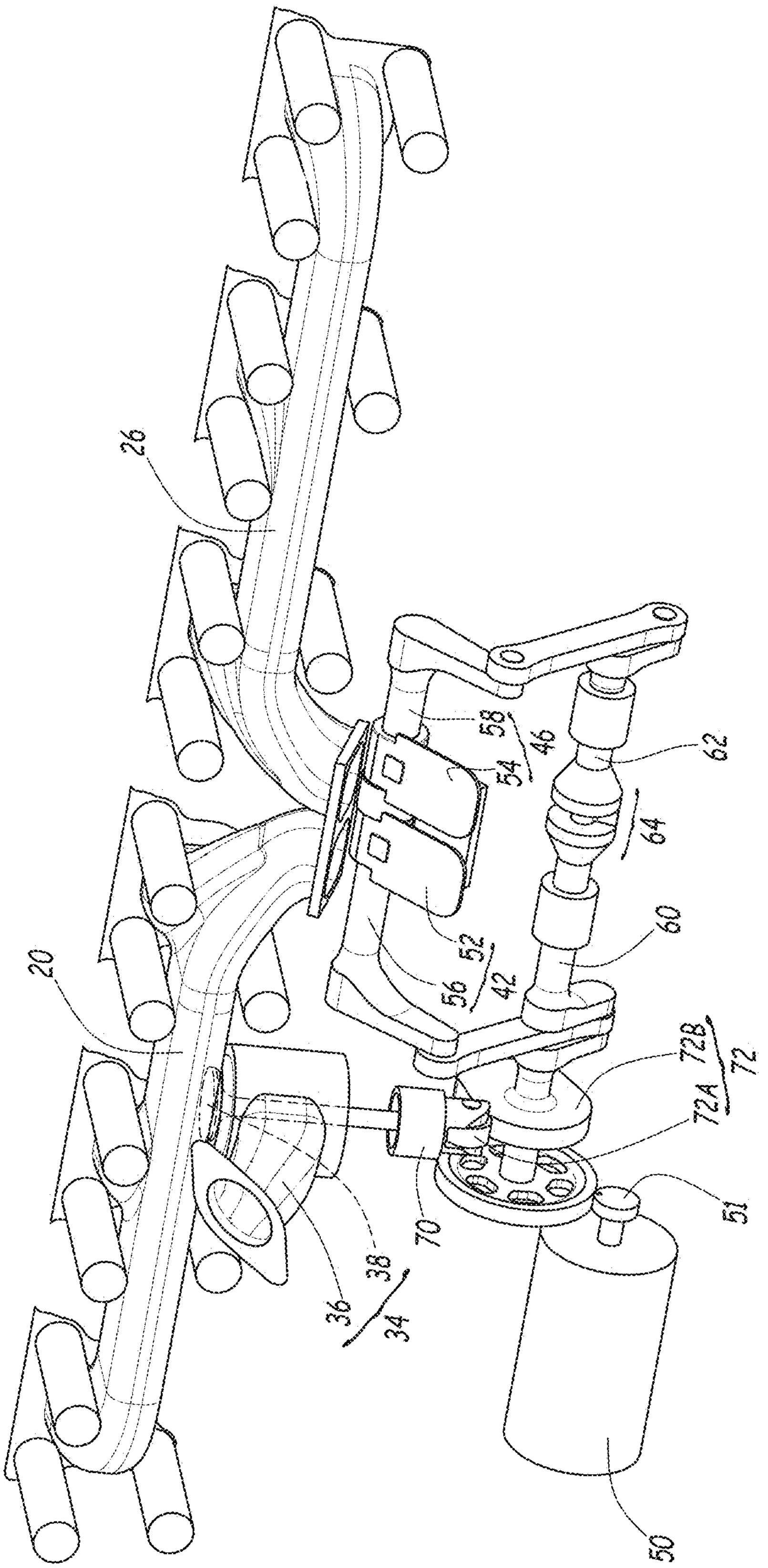
FIG. 2 is a perspective view of a portion of the engine system of FIG. 1, in a first configuration.
Figure 3:
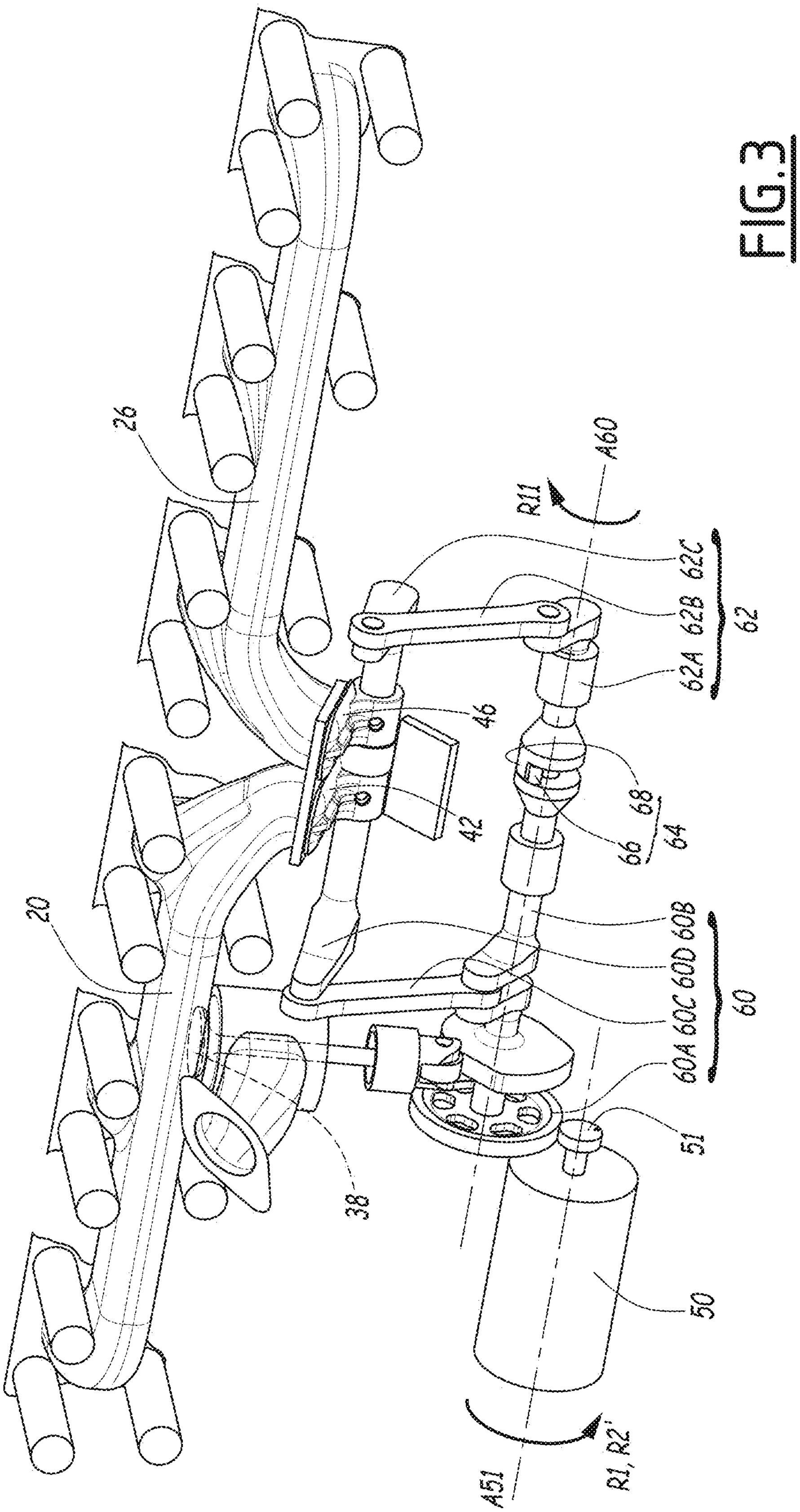
FIG. 3 is a perspective view of a portion of the engine system of FIG. 1, similar to FIG. 2, in a second configuration.
Figure 4:
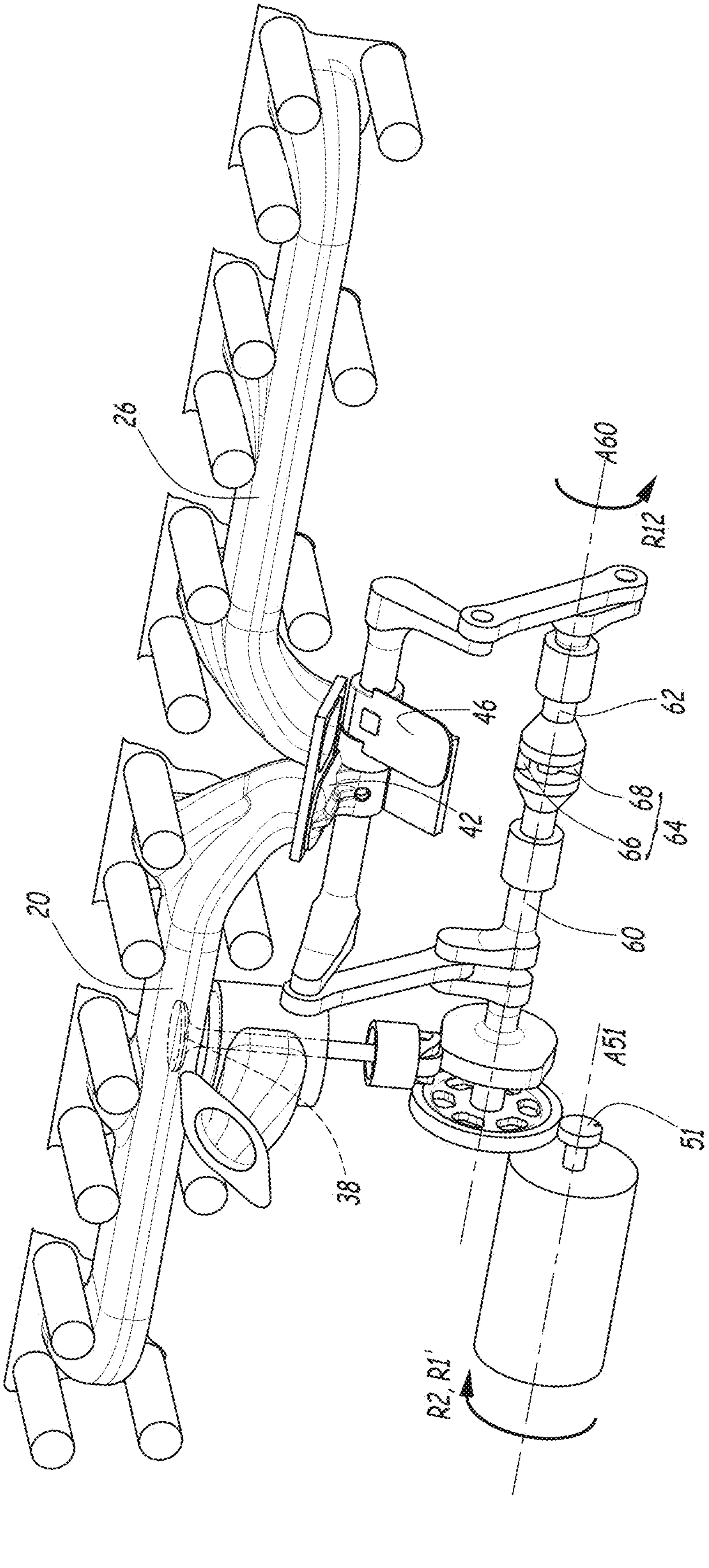
FIG. 4 is a perspective view of a portion of the engine system of FIG. 1, similar to FIGS. 2 and 3, in a third configuration.

The proportional recirculation valve 38 is adapted to control a flow of exhaust gas 40 in the recirculation conduit 36. The proportional recirculation valve 38 is operable between an open position, in which the flow of exhaust gas 40 is allowed, and a closed position, in which the flow of exhaust gas 40 is prevented, the closed position being a resting position of the proportional recirculation valve 38. In FIGS. 2 to 4, the proportional recirculation valve 38 is shown in dotted lines, as it is hidden by the first exhaust collector 20 and the recirculation conduit 36.

Thus, the intake 14 of the internal combustion engine 12 is provided with air by the charged air cooler 84, and when the proportional recirculation valve 38 is in its open position, it is provided with exhaust gases by the exhaust gas recirculation system 34.

In the example, the proportional recirculation valve 38 is a poppet valve, that is, a linearly activated valve. Preferably, the engine system 10 comprises a non-represented return spring, which exerts a force on the proportional recirculation valve 38 that tends to close the proportional recirculation valve. As a variant, the proportional recirculation valve 38 is another type of valve, such as, for example, a flap valve.

The engine system 10 comprises a first proportional exhaust valve 42, that is, a continuously operable valve, adapted to control a flow of exhaust gas 44 in the first exhaust conduit 30, and operable between an open position, in which the flow of exhaust gas is allowed, and a closed position, in which the flow of exhaust gas is prevented, the open position being a resting position of the first proportional exhaust valve.

The engine system 10 comprises a second proportional exhaust valve 46, that is, a continuously operable valve, adapted to control a flow of exhaust gas 48 in the second exhaust conduit 32, and operable between an open position, in which the flow of exhaust gas is allowed, and a closed position, in which the flow of exhaust gas is prevented, the open position being a resting position of the second proportional exhaust valve.

In the example, the first proportional exhaust valve 42 is an asymmetric flap valve comprising a flap 52 and a shaft 56 on which the flap is fixed. The rotation of the shaft 56 leads to the opening or closing of the flap 52. Advantageously, the shaft 56 is off-center with respect to the flap 52. Similarly, the second proportional exhaust valve 46 is an asymmetric flap valve comprising a flap 54 and a shaft 58 on which the flap is fixed. The rotation of the shaft 58 leads to the opening or closing of the flap 54. Advantageously, the shaft 58 is off-center with respect to the flap 54.

As a variant, the first and second proportional exhaust valves 42, 46 are of another type of valves, such as, for example, poppet valves.

Practically speaking, the open position of the first and second proportional exhaust valves 42, 46 are the resting position of the proportional exhaust valves due to the shafts 56, 58 not being centered in relation with the flaps 52, 54 and to the action of the exhaust gases from the exhaust collectors 20, 26, which exerts pressure on the flaps 52, 54 leading to the opening of the flaps. Optionally, the first and second proportional exhaust valves 42, 46 comprise return springs to force the opening of the flaps 52, 54. With such springs, the proportional exhaust valves 42, 46 can be symmetric flap valves, with the shafts 56, 58 centered with respect to the flaps 52, 54.

By operating the proportional recirculation valve 38, the first proportional exhaust valve 42 and the second proportional exhaust valve 46, the engine system is switchable between multiple configurations. Three exemplary configuration are described here below.

In a normal operating configuration of the engine system 10, the first and second proportional exhaust valves 42, 46 are in their open position and the proportional recirculation valve 38 is in its closed position. In other words, in the normal operating position, the flow of exhaust gas 40 is prevented and the flows of exhaust gases 44 and 48 are allowed, so that the exhaust gases generated by the internal combustion engine 12 are completely redirected to the turbocharger 28. The normal operating condition is represented on FIG. 2.

In a braking configuration of the engine system 10, the first and second proportional exhaust valves 42, 46 are in their closed position and the proportional recirculation valve 38 is in its closed position. In other words, in the braking configuration, the flow of exhaust gas 40 is prevented and the flows of exhaust gases 44 and 48 are also prevented, so that the exhaust gases generated by the internal combustion engine 12 are prevented to exit the internal combustion engine, thus increasing the pressure in the internal combustion engine. For example, the pressure inside the internal combustion engine can rise to 6 bars. This increase of pressure results in a braking torque, therefore decreasing the rotational speed of the internal combustion engine 12 and braking the vehicle propelled by the engine system. Hence, the braking configuration can be used to brake the vehicle. The braking configuration is represented on FIG. 3.

In a recirculation configuration of the engine system 10, the first proportional exhaust valve 42 is in its closed position, the second proportional exhaust valve 46 is in its open position and the proportional recirculation valve 38 is in its open position. In other words, in the recirculation configuration, the flow of exhaust gas 40 is allowed, the flow of exhaust gas 44 is prevented and the flow of exhaust gas 48 is allowed. Thus, in this configuration, the first exhaust collector 20 is in fluid communication with the intake 14 and the second exhaust collector 26 is in fluid communication with the turbocharger 28. Hence, the recirculation configuration can be used when recirculation of exhaust gas is needed, for example to decrease the nitrogen oxide emission of the internal combustion engine 12. The recirculation configuration is represented on FIG. 4.

To operate the first and second proportional exhaust valves 42, 46 and the proportional recirculation valve 38, the engine system 10 comprises a single actuator 50 comprising an output component 51. The output component 51 is operable by the actuator 50 in two different direction of movement. Thus, the actuator 50 is operable in two different modes.

In the example, the actuator 50 is a rotating actuator and the output component 51 can be operated by the actuator 50 in two different directions of rotation.

As an alternative, not shown, the actuator 50 is a linear actuator and the output component 51 can be operated by the actuator 50 in two different directions of translation. The actuator is, for example, a rack and pinion system, or any other kind of actuator having two different directions of movement.

The output component 51 is in a neutral position when the engine system 10 is in the normal operating configuration. When the actuator 50 is operated in a first mode, the output component moves from its neutral position according to a first movement R1 and when the actuator 50 is operated in a second mode, the output component moves from its neutral position according to a second movement R2.

In the example, the first movement is a first rotation R1 around a rotation axis A51 of the component 51, with a first orientation, whereas the second movement is a second rotation R2 around the axis A51 of the component 51, with a second orientation, opposite to the first orientation.

In the example, the first movement R1 of the output component 51 switches the engine system 10 from its normal operating configuration to its braking configuration.

Therefore, the first movement of the output component 51 operates the two proportional exhaust valves 42 and 44 from their open position to their closed position and does not operate the proportional recirculation valve 38.

In the example, the second movement R2 of the output component 51 switches the engine system 10 from its normal operating configuration to its recirculation configuration.

Therefore, the second movement of the output component 51 operates the first proportional exhaust valve 42 from its open position to its closed position, operates the proportional recirculation valve 38 from its closed position to its open position, and does not operate the second proportional exhaust valve 46.

In other words, in the example, the first proportional exhaust valve 42 is operated by both movements R1, R2 of the output component 51, the second proportional exhaust valve 46 is operated only by the first movement R1 of the output component and the proportional recirculation valve 38 is operated only by the second movement R2 of the output component.

To selectively operate the valves 38, 42 and 46 with the output component 51 depending on the direction of movement of the output component, the engine system 10 comprises a kinematic chain that connects the output component to the valves.

The kinematic chain comprises a first transmission device 60 connected to the output component 51 of the actuator 50 and to the first proportional exhaust valve 42. The first transmission device 60 is driven by the output component 51 regardless of the direction of movement of the output component. In other words, the movements R1 and R2 of the output component 51 are transmitted to the first proportional exhaust valve 42 through the first transmission device 60. Thus, the first movement R1 of the output component 51 corresponds to a first movement of the first transmission device 60 and the second movement R2 of the output component corresponds to a second movement of the first transmission device.

In the example, the first transmission device 60 comprises an input component 60A, which interacts with the output component 51 of the actuator 50 so that the movement of the output component is transmitted to the input component 60A, a main shaft 60B, which rotates around a rotation axis A60, a first crank 60C, with one of its extremities connected to the main shaft 60B, and a second crank 60D, with one of its extremities connected to the first crank 60C and the other one of its extremities connected to the first shaft 56 of the first proportional exhaust valve 42. In the example, the output component 51 and the input component 60A are gears that are engaged together. Other designs of the first transmission device 60 can be considered.

In this example, the first movement R1 of the output component is converted by the cooperation of the gears into a first movement of the main shaft 60B, in a first direction of movement, which is a first rotation R11 around the axis A60 with a first orientation. The second movement R2 of the output component is converted by the cooperation of the gears into a second movement of the main shaft 60B, in a second direction of movement, which is a second rotation R12 around the axis A60, with a second orientation, opposite to the first orientation.

As a variant, not shown, the output component 51 directly drives the main shaft 60B, or is a part of the main shaft 60B. In other words, in such a variant, the main shaft 60B is a part of the actuator 50.

The kinematic chain comprises a second transmission device 62 connected to the first transmission device 60 and to the second proportional exhaust valve 46, and a first asymmetrical linkage 64 which is interposed between the first transmission device 60 and the second transmission device 62. The first asymmetrical linkage 64 transmits the first movement R11 of the first transmission device 60 to the second transmission device 62, but does not transmit the second movement R12 of the transmission device to the second transmission device. In other words, only the first movement of the output component 51 is transmitted, through the first transmission device 60, the first asymmetrical linkage 64 and the second transmission device 62, to the second proportional exhaust valve 46. Thus, the first movement of the output component 51 induces a movement of the second transmission device 62 and the second movement of the output component leads to no movement of the second transmission device.

In the example, the second transmission device 62 comprises a main shaft 62A aligned on the axis A60, a first crank 62B, with one of its extremities connected to the main shaft 62A, and a second crank 62C, with one of its extremities connected to the first crank 62B and the other one of its extremities connected to the second shaft 58 of the second proportional exhaust valve 46. Other designs of the second transmission device 62 can be considered.

In the example, the first asymmetrical linkage 64 comprises a tab 66, mounted on the first transmission device 60, and an abutment surface 68, located on the second transmission device 62. More precisely, the tab 66 is mounted on an extremity of the main shaft 60B of the first transmission device 60 and the abutment surface 68 is located on an extremity of the main shaft 62A of the second transmission device 62. During the first movement of the output component 51, the tab 66 is in abutment against the abutment surface 68 so that it transmits the first movement of the output component to the second transmission device 62, and during the second movement of the output component, the tab is not in contact with the abutment surface so that it does not transmit the second movement of the output component to the second transmission device 62. Other designs of the first asymmetrical linkage 64 can be considered.

In the example, due to the conception of the first asymmetrical linkage 64, the movement of the first proportional exhaust valve 42 is advantageously identical to the movement of the second proportional exhaust valve 46 during the first movement of the output component 51. In other words, the closing of the first proportional exhaust valve 42 is identical to the closing of the second proportional exhaust valve 46, that is, the first movement of the output component 51 closes the first and the second proportional exhaust valves 42, 46 simultaneously and at the same speed.

The kinematic chain comprises a third transmission device 70 connected to the first transmission device 60 and to the proportional recirculation valve 38, and a second asymmetrical linkage 72 which is interposed between the first transmission device 60 and the third transmission device 70. The second asymmetrical linkage 72 transmits the second movement R12 of the first transmission device 60 to the third transmission device 70, but does not transmit the first movement R11 of the transmission device to the third transmission device. In other words, only the second movement of the output component 51 is transmitted, through the third transmission device 70, to the proportional recirculation valve 38. Thus, the second movement of the output component 51 induces a movement of the third transmission device 70 and the first movement of the output component leads to no movement of the third transmission device.

In the example, the third transmission device 70 is fixed at an extremity of the proportional recirculation valve 38.

In the example, the second asymmetrical linkage 72 includes a cam 72B, which is mounted onto the first transmission device 60, and more precisely onto the main shaft 60B of the first transmission device, and a roller 72A, which is attached to the third transmission device 70. The roller 72A rolls onto the cam 72B. The profile of the cam 72B is chosen so that, during the first movement of the output component 51, the roller 72A is not set into motion by the cam 72B and the first movement of the output component is therefore not transmitted to the third transmission device 70, so that the proportional recirculation valve 38 is not operated and stays in its closed position. Furthermore, the profile of the cam 72B is chosen so that, during the second movement of the output component 51, the roller 72A is set into motion by the cam 72B so that the second movement of the output component is transmitted to the third transmission device, and therefore the proportional recirculation valve 38 is operated by the third transmission device from its closed position to its open position. Other designs of the second asymmetrical linkage 72 can be considered.

Thanks to the kinematic chain of the engine system 10, the first movement of the output component 51 operates the first proportional exhaust valve 42 and the second proportional exhaust valve 46 and does not operate the proportional recirculation valve 38, and the second movement of the output component 51 operates the first proportional exhaust valve 42 and the proportional recirculation valve 38 and does not operate the second proportional exhaust valve 46.

Therefore, thanks to the kinematic chain of the engine system 10, the actuator 50 alone is sufficient to operate the three valves 38, 42 and 46. Therefore, it is possible to switch the engine system 10 from the normal operating condition to the braking configuration, or to the recirculation configuration, only by actuating the output component 51 of the actuator 50 in a first or in a second direction of movement.

The number of actuators needed to operate the engine system 10 is thus reduced, in comparison with existing engine system, leading to a decrease in the manufacturing cost of the engine system 10 and a better compactness of the engine system. The control of the valves 38, 42 and 46 is also facilitated and more reliable, since only one actuator is operating all these valves, and therefore only one actuator needs to be controlled to modify the configuration of the engine system 10.

It is to be understood that the switching of the engine system 10 from its normal operating condition to its braking configuration or to its recirculation configuration is described here above in details, but that the actuator 50 and the kinematic chain 60-72 also permits switching the engine system from its braking configuration to its normal operating condition and from its recirculation configuration to its normal operating condition. In particular, a reverse of the first movement R1 of the output component 51 leads to the opening of the first and second proportional exhaust valves 42, 46 through the operating of the kinematic chain and due to the pressure exerted by exhaust gases onto the proportional exhaust valves, and does not operate the proportional recirculation valve 38, and thus allows switching the engine system from its braking configuration to its normal operating condition. Furthermore, a reverse of the second movement R2 of the output component 51 leads to the opening of the first proportional exhaust valve 42, through the operating of the kinematic chain and due to the pressure exerted by exhaust gases onto the first proportional exhaust valve, leads to the closing of the proportional recirculation valve 38, due to the action of the return spring exerting a force on the proportional recirculation valve, and does not operate the second proportional exhaust valve 46, and thus allows switching the engine system from its recirculation configuration to its normal operating condition. More precisely, the reverse of the first movement of the output component 51 corresponds to a movement of the output component from the position obtained after the first movement to the neutral position, in the same direction as in the second movement, and the reverse of the second movement of the output component 51 corresponds to a movement of the output component from the position obtained after the second movement to the neutral position, in the same direction as in the first movement.

In the example, the first and second proportional exhaust valves 42, 46 are located at the exhaust of the first and second exhaust collectors 20, 26, upstream of the first and second exhaust conduits 30, 32, in the direction of gas flows 44 and 48. As a variant, not shown, the first and second proportional exhaust valves 42, 46 are located inside the turbocharger 28, or respectively inside the first exhaust collector 20 and inside the second exhaust collector 26.

As a variant, not shown, the engine system 10 comprises a secondary actuator dedicated to the operation of the proportional recirculation valve 38 and the actuator 50 only operates the first and second proportional exhaust valves 42, 46. The secondary actuator is only used to switch the engine system 10 in the recirculation configuration. In this variant, a first direction R1 of movement of the output component 51, corresponding to the first direction of movement R1 described here above, leads the output component 51 to operate both the first and second proportional exhaust valves 42, 46, and a second direction of movement R2 of the output component 51, corresponding to the second direction of movement R2 described here above, leads the output component 51 to operates only the first proportional exhaust valve 42 and not to operate the second proportional exhaust valve 46. In such a variant, the operation of the proportional recirculation valve 38 is separated from the operation of the first and second proportional exhaust valves 42, 46. Thus, the proportional recirculation valve 38 can also be used in other situation where the actuation of the proportional exhaust valves 42, 46 is not necessarily needed, leading to a more versatile and reliable operation of the engine system 10.

As a variant, not shown, the engine system 10 comprises a secondary actuator dedicated to the operation of the second proportional exhaust valve 46 and the actuator 50 only operates the first proportional exhaust valve 42 and the proportional recirculation valve 38. Thus, the secondary actuator is only used to switch the engine system 10 in the braking configuration. In this variant, a first direction of movement R1' of the output component 51, corresponding to the second direction of movement R2 described here above, leads the output component 51 to operate both the first proportional exhaust valve 42 and the proportional recirculation valve 38, and a second direction on movement R2' of the output component 51, corresponding to the first direction of movement R1 described here above, leads the output component 51 to operates only the first proportional exhaust valve 42 and not to operate the proportional recirculation valve 38. In such a variant, the operation of the second proportional exhaust valve 46 is separated from the operation of the first proportional exhaust valve 42 and of the proportional recirculation valve 38. In a configuration where the proportional recirculation valve 38 is open and the first proportional exhaust valve 42 is closed, having a separate actuator to operate the second proportional exhaust valve 46 allows for fine tuning of the opening of the second proportion la exhaust valve 46, allowing to control the back pressure inside the second exhaust collector 26 of the second set of cylinders 22.

As a variant, not shown, the actuator 50 and the kinematic chain are used to operate other valves in the engine system 10 than the valves described here above, such as, for example, a valve controlling the flow of air passing through the charged air cooler 84, and/or a valve controlling a flow of gas between the turbocharger 28 and the exhaust after-treatment system 82, or downstream of the exhaust after-treatment system 82, and/or a valve controlling a flow of gas upstream of the compressor 86.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising." "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. An engine system, comprising:

an internal combustion engine, comprising an intake, a first set of cylinders including at least a first cylinder and a first exhaust collector, and a second set of cylinders including at least a second cylinder and a second exhaust collector, a turbocharger, a first exhaust conduit, providing fluid communication between the first exhaust collector and the turbocharger, a second exhaust conduit, providing fluid communication between the second exhaust collector and the turbocharger, an exhaust gas recirculation system, comprising:

a recirculation conduit, providing fluid communication between the first exhaust collector and the intake of the internal combustion engine, and a proportional recirculation valve, adapted to control a flow of exhaust gas in the recirculation conduit, and operable between an open position in which the flow of exhaust gas is allowed, and a closed position in which the flow of exhaust gas is prevented, the closed position being a resting position of the proportional recirculation valve, a first proportional exhaust valve, adapted to control a flow of exhaust gas in the first exhaust conduit, and operable between an open position in which the flow of exhaust gas is allowed, and a closed position in which the flow of exhaust gas is prevented, the open position of the first proportional exhaust valve being a resting position of the first proportional exhaust valve, and a second proportional exhaust valve, adapted to control a flow of exhaust gas in the second exhaust conduit, and operable between an open position in which the flow of exhaust gas is allowed, and a closed position in which the flow of exhaust gas is prevented, the open of the second proportional exhaust valve position being a resting position of the second proportional exhaust valve, wherein the engine system is switchable between:

a first configuration, in which the first proportional exhaust valve is in the open position of the first proportional exhaust valve, the second proportional exhaust valve is in the open position of the second proportional exhaust valve, and the proportional recirculation valve is in the closed position of the proportional recirculation valve, and a second configuration, in which the first proportional exhaust valve is in the closed position of the first proportional exhaust valve, wherein the engine system comprises an actuator and a kinematic chain configured to operate at least two valves among the proportional recirculation valve, the first proportional exhaust valve and the second proportional exhaust valve, wherein an output component of the actuator comprises a gear and is in a neutral position when the engine system is in the first configuration, wherein a first movement of the output component, from the neutral position of the output component and in a first direction (R1; R1'), operates each of the at least two valves from the resting position of the respective at least two valves to another position, and wherein a second movement of the output component, from the neutral position of the output component and in a second direction (R2; R2') opposite to the first direction, operates only one of the at least two valves from the resting position of the only one of the at least two valves to another position, and wherein the output component of the actuator is configured to operate each of the proportional recirculation valve, the first proportional exhaust valve, and the second proportional exhaust valve.

2. The engine system of claim 1, wherein the first movement of the output component closes the first proportional exhaust valve and the second proportional exhaust valve, and wherein the second movement of the output component closes the first proportional exhaust valve and does not operate the second proportional exhaust valve.

3. The engine system of claim 2, wherein the first movement of the output component closes the first proportional exhaust valve and the second proportional exhaust valve at a same speed.

4. The engine system of claim 2, wherein each one of the first proportional exhaust valve and the second proportional exhaust valve is an asymmetric flap valve comprising a flap and a shaft, wherein a rotation of the respective shafts lead to an opening or a closing of the respective flaps, and wherein the rotation of each of the shafts is driven by the output component of the actuator.

5. The engine system of claim 2, wherein the kinematic chain comprises a first transmission device connected to the output component of the actuator and to the first proportional exhaust valve, a second transmission device connected to the first transmission device and to the second proportional exhaust valve and a first asymmetrical linkage, the first asymmetrical linkage being configured to:

transmit the first movement of the output component from the first transmission device to the second transmission device, and not to transmit the second movement of the output component from the first transmission device to the second transmission device.

6. The engine system of claim 5, wherein the first asymmetrical linkage comprises a tab, mounted on the first transmission device and an abutment surface located on the second transmission device, and wherein:

during the first movement of the output component, the tab is in abutment against the abutment surface, and during the second movement of the output component, the tab is not in contact with the abutment surface.

7. The engine system of claim 1, wherein, the first movement of the output component closes the first proportional exhaust valve and opens the proportional recirculation valve and wherein the second movement of the output component closes the first proportional exhaust valve and does not operate the proportional recirculation valve.

8. The engine system of claim 7, wherein the kinematic chain comprises a first transmission device connected to the output component of the actuator and to the first proportional exhaust valve, a third transmission device connected to the first transmission device and to the proportional recirculation valve and a second asymmetrical linkage, the second asymmetrical linkage being configured to:

transmit the first movement of the output component from the first transmission device to the third transmission device, and not to transmit the second movement of the output component from the first transmission device to the third transmission device.

9. The engine system of claim 8, wherein the proportional recirculation valve is a poppet valve and wherein the second asymmetrical linkage includes a cam mounted onto the first transmission device and a roller attached to the third transmission device.

10. The engine system of claim 1, wherein, the first movement of the output component closes the first proportional exhaust valve and the second proportional exhaust valve and does not operate the proportional recirculation valve and wherein, the second movement of the output component closes the first proportional exhaust valve, opens the proportional recirculation valve and does not operate the second proportional exhaust valve.

11. The engine system of claim 10, wherein the kinematic chain comprises:

a first transmission device connected to the output component of the actuator and to the first proportional exhaust valve, a second transmission device connected to the first transmission device and to the second proportional exhaust valve, a third transmission device connected to the first transmission device and to the proportional recirculation valve, a first asymmetrical linkage, the first asymmetrical linkage being configured to:

transmit the first movement of the output component from the first transmission device to the second transmission device, and not to transmit the second movement of the output component from the first transmission device to the second transmission device, a second asymmetrical linkage, the second asymmetrical linkage being configured to:

transmit the second movement of the output component from the first transmission device to the third transmission device, and not to transmit the first movement of the output component from the first transmission device to the third transmission device.

* * * * *